United States Patent
Verdiell et al.

(10) Patent No.: US 6,886,993 B2
(45) Date of Patent: *May 3, 2005

(54) OPTOELECTRONIC ASSEMBLY HAVING A FLEXURE THAT SUPPORTS MULTIPLE OPTICAL ELEMENTS

(75) Inventors: Jean-Marc Verdiell, Palo Alto, CA (US); Eric Zbinden, Mountain View, CA (US); Robert Kohler, Mountain View, CA (US); Jonas Webjorn, Redwood City, CA (US); Sylvain Colin, Milpitas, CA (US); Marc Epitaux, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/077,003

(22) Filed: Feb. 14, 2002

(65) Prior Publication Data

US 2003/0156800 A1 Aug. 21, 2003

(51) Int. Cl.⁷ ................................................ G02B 6/36
(52) U.S. Cl. ............................. 385/88; 385/91; 385/93
(58) Field of Search .............................. 385/88, 90, 91, 385/92, 93

(56) References Cited

U.S. PATENT DOCUMENTS

| 6,227,724 | B1 | * | 5/2001 | Verdiell ....................... 385/91 |
| 6,511,236 | B1 | * | 1/2003 | Webjorn et al. .............. 385/91 |
| 6,585,427 | B2 | * | 7/2003 | Finot et al. ................... 385/92 |
| 6,608,959 | B2 | * | 8/2003 | Jang et al. ................... 385/136 |
| 2002/0025126 | A1 | * | 2/2002 | Finot et al. ................... 385/92 |
| 2003/0152355 | A1 | * | 8/2003 | Verdiell et al. .............. 385/136 |

* cited by examiner

Primary Examiner—Rodney Bovernick
Assistant Examiner—Sung Pak
(74) Attorney, Agent, or Firm—Blakely, Sokoloff, Taylor & Zafman LLP

(57) ABSTRACT

A package is described. In one embodiment, the package includes multiple optical elements and multiple flexures, with at least one optical element attached to each flexure. The optical elements may be in alignment with each other. In an alternative embodiment, multiple optical elements are attached to a single flexure.

30 Claims, 17 Drawing Sheets

OPTOELECTRONIC ASSEMBLY HAVING A FLEXURE THAT SUPPORTS MULTIPLE OPTICAL ELEMENTS

RELATED APPLICATIONS

This application is related to the application entitled An Optoelectronic Assembly, concurrently filed on Feb. 14, 2002, U.S. patent application Ser. No. 10/077,436, assigned to the corporate assignee of the present invention.

FIELD OF THE INVENTION

The present invention relates generally to optoelectronic assemblies having optical elements and methods for making the same; more particularly, the present invention relates to an assembly having optical elements mounted on a plurality of flexures and methods for making the same.

BACKGROUND OF THE INVENTION

Sealed packages are used to contain, protect, and couple to optical fibers and electrically connect optoelectronic components. Optoelectronics packaging is one of the most difficult and costly operations in optoelectronics manufacturing. Optoelectronic packages may provide submicron alignment between optical elements, high-speed electrical connections, excellent heat dissipation, and high-reliability. Providing such features has resulted in optoelectronic packages that are an order of magnitude larger, costlier and difficult to manufacture than electronic packages, particularly for fiber coupled devices. In addition, current designs of optoelectronic packages and associated fabrication processes are ill adapted for automation because today's high-performance butterfly packages are characterized by a large multiplicity of mechanical parts (submounts, brackets, ferrules . . . ), three-dimensional (3D) alignment requirements, and poor mechanical accessibility.

U.S. Pat. No. 5,570,444 by Janssen discloses optically coupling optical fibers to injection lasers. The end of an optical fiber is held in alignment with an injection laser by securing the fiber to an elongate support member whose end nearer the injection laser is then laser beam welded to a pair of slide members that had been previously secured by laser beam welding to leave a precisely dimensioned small gap between the support and slide members. The end of the support member remote from the injection laser is secured by laser beam welding to a plastically deformable saddle. No pressure is applied to the elongated support member or saddle, and the arms and feet of the saddle do not spread apart as the fiber is secured and aligned. In addition, the fiber is aligned before the end of the support member is welded to the plastically deformable saddle. Accordingly, this method does not allow for flexibility in adjusting the vertical height of the fiber after the support member is welded to the saddle.

U.S. Pat. No. 5,195,555 by Shimaoka discloses an optical coupling technique as well as a lens holder. The optical coupling apparatus includes a light emitting diode, a lens, an optical isolator, and an optical fiber disposed on a common optical axis. The individual optical elements are roughly adjusted in the respective positions and fixed. Then, a precise and final adjustment is effectuated by plastically deforming a portion of a holder for supporting the lens or the optical isolator and/or by adjusting inclination of the holder. However, the lens holder is secured without any application of pressure on the lens holder that would allow for flexibility in adjusting the vertical height of the lens after the lens holder has been secured. In addition, this apparatus uses numerous parts in complex three-dimensional arrangements and are unsuitable for automated assembly.

U.S. Pat. No. 5,619,609 by Pan discloses an improved clip for supporting an end of an optical fiber relative to a mount surface. A sleeve is disposed over the optical fiber adjacent to its end. The clip comprises a clip body with an upper and lower surface, with a flange disposed adjacent to the lower surface. The flange is affixable to the mount surface, and walls extend from the upper surface of the body to define a channel at which the clip is affixable about the sleeve. When the sleeve is affixed within the channel, the body rigidly couples the sleeve to the flange, thereby avoiding misalignment between the optical fiber and any optical device which is on or supported by the mount surface. Accordingly, this does not allow for flexibility in adjusting the vertical height of the fiber when aligning the fiber with any optical device supported by the mount surface.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
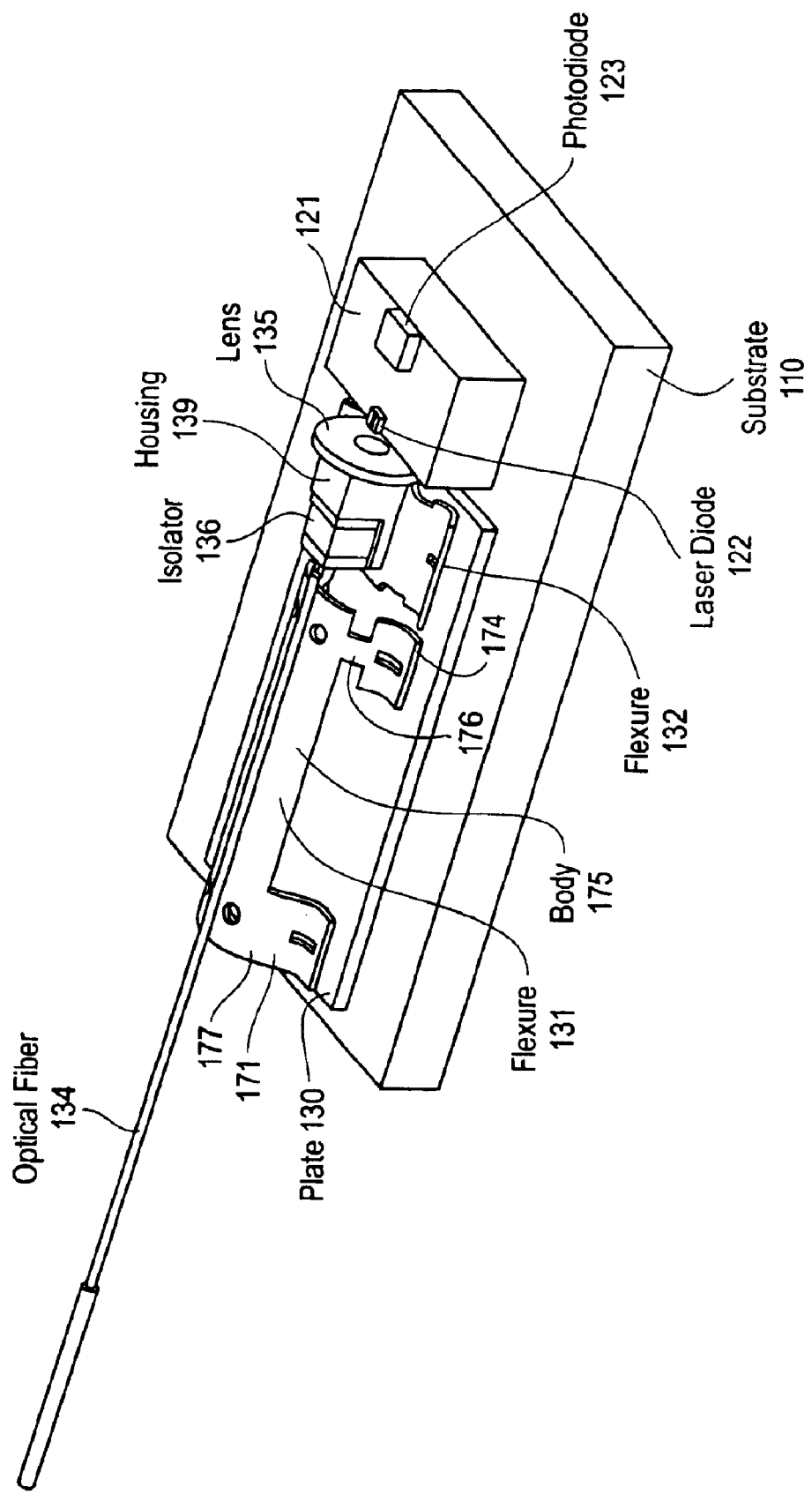
FIG. 1 shows one embodiment of an optoelectronic package assembly.

A package is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Overview

In one embodiment, the package includes multiple optical elements and multiple flexures, with at least one optical element attached to each flexure. The optical elements may be in alignment with an optical axis.

In another embodiment, the package includes a flexure that has at least two optical elements coupled thereto.

An optoelectronic package uses a flexure coupled to one or more optical components in order to support the component(s) as well as align one or more components in the package. In one embodiment, the flexure is attached (e.g., welded) to a portion of the interior of the package as part of the pick and place mounting method, and the alignment of the optical component is adjustable in three dimensions.

The flexure may comprise of two or more legs that rest on a substrate or on each side of a frame in a package. In one embodiment, the legs are joined by a body that supports and/or is coupled to one or more optical elements.

The flexure may be designed so that in its natural (non-flexed) state, the optical axis of the optical component attached to the body rests slightly above the optical plane of the package. Final adjustment of the height is obtained by applying pressure to the flexure, therefore lowering (at least a portion of) the body height. Dragging the flexure in the plane parallel to the plane of a structure in a package (e.g., a frame) may be performed to correct the lateral position. When adequate alignment is reached, the legs are permanently attached to the frame or substrate. The attachment may be by, for example, laser welding, soldering or bonding.

In another embodiment, the flexure has more than two legs. During alignment, the legs spread out when the flexure is compressed, and then its legs are fixed in place to prevent the flexure from springing back up, thereby maintaining the alignment. More specifically, the first pair of legs is attached to a structure in a package (e.g., a frame) after coarse optical alignment. The flexure is then finely realigned, using the residual flexibility left after the first two legs are attached. When a desired position is reached, the remaining legs are attached.

In one embodiment, the flexure is a single component made of thin Kovar that has been etched or stamped and then bent in a press. The flexure may comprise two or more legs joined by a bridge where the bridge supports the optical components. The flexure may also have surfaces bent to provide a vertical and/or horizontal plane on which to mount the optical and/or electronic components. The single component flexure can have features for handling (e.g., holes or surfaces designed for gripping by a manufacturing tool). Once created, the flexure can rest on a support structure such as the substrate or on each side of the frame.

FIG. 1 illustrates one embodiment of an optoelectronic assembly 100. Referring to FIG. 1, optoelectronic assembly 100 comprises a substrate 110 with a raised platform 121 (e.g., a riser) and a plate 130 (e.g., welding plate, bonding plate) coupled to its top. In one embodiment, platform 121 and plate 130 are substantially planar. Platform 121 and plate 130 may be attached to substrate 110, for example, by soldering or brazing, or may even be part of the substrate material itself. Platform 121 may be made of a high thermal conductivity material, such as, for example, copper tungsten, Aluminum Nitride, Berillyum Oxide, Diamond, and Boron Nitride, attached to platform 121. A laser diode 122 and a photodiode 123 may be coupled on top of platform 121. Photodiode 123 monitors the light emitted by back facets of laser diode 122. In an alternative embodiment where optoelectronic assembly 100 is a receiver, photodiode 113 would replace laser diode 122 on platform 121 (and an isolator such as isolator 136 would not be necessary).

A pair of flexures, flexure 131 and flexure 132, are coupled to plate 130. An optical fiber 134 is coupled to flexure 131 by, for example, soldering, brazing or welding.

In one embodiment, flexure 131 comprises four legs/feet, two of which, namely legs 171 and 174, are shown with the other two located on the other side of flexure 131, a body (or bridge) 175, monopost flexing spring regions 176 on each side of body 175, and bipost flexing spring regions 177 on each side of body 175. Such a flexure may be one described in U.S. Pat. No. 6,207,950, entitled "An OptoElectronic Assembly Having a Flexure for Maintaining Alignment Between Optical Elements", issued Mar. 27, 2001, and U.S. patent application Ser. No. 09/885,240, entitled "A Flexure", filed Jun. 19, 2001, both of which are incorporated herein by reference.

Flexure 132 includes a housing 139 that supports a lens 135 and an isolator 136, which are coupled thereto. Optical fiber 134, lens 135, isolator 136, and laser diode 122 are optically aligned along the same optical axis.

Figure 2:
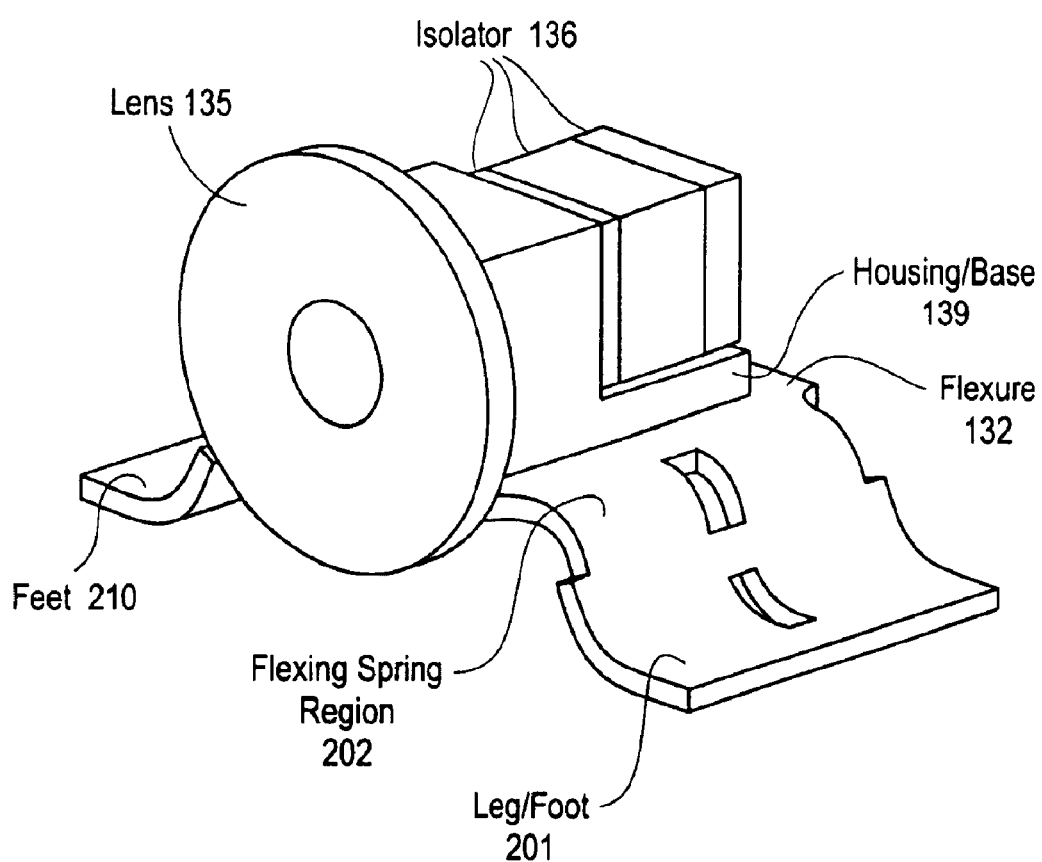
FIG. 2 illustrates one embodiment of the flexure in the package assembly of FIG. 1.

FIG. 2 illustrates flexure 132 with its housing 139. Housing 139 includes a base upon which isolator 136 sits. In one embodiment, isolator 136 includes a pair of polarizers on opposite sides of a Faraday rotator. Lens 135 is also shown attached to housing 139. Flexure 132 also includes legs/feet 201 and flexing spring regions 202 on both sides of housing 139.

In operation, laser diode 122 emits light that is collected and focused by lens 135 into the core of optical fiber 134. Other optical elements may be used, including other edge or surface emitting optoelectronic elements. In another alternative embodiment, the package includes a receiver with an optical receiving device (e.g., a photodetector) mounted on platform 121.

Figure 3:
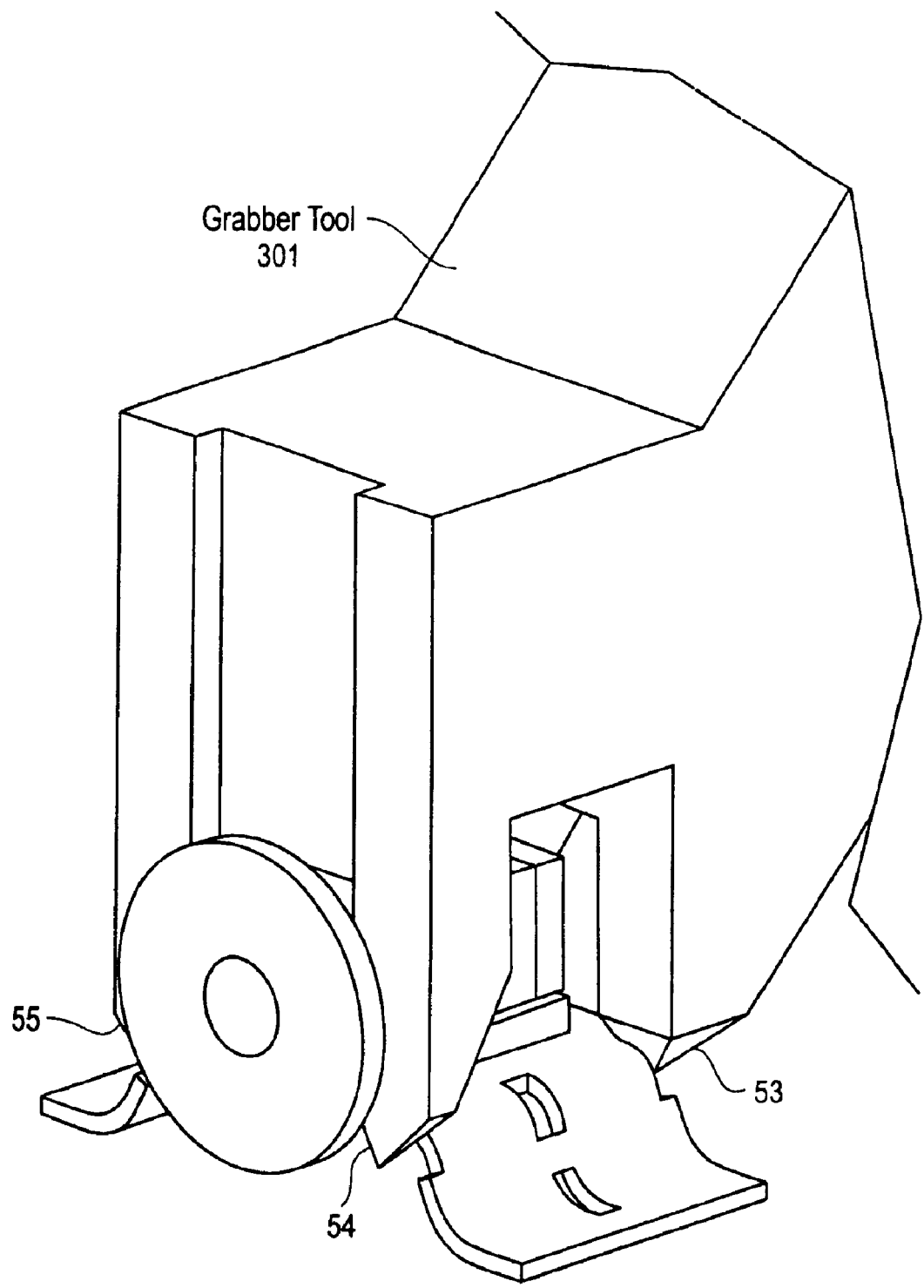
FIG. 3 illustrates one embodiment of a manufacturing tool shown positioning the flexure shown in FIG. 2.

FIG. 3 illustrates a grabber tool that is used to place flexure 132 onto welding plate 130 for attachment. The alignment process for aligning the optical fiber 134, lens 135 (and isolator 136) and laser diode 122 by first attaching lens 135 and isolator 136 to the bridge of flexure 132 by a process such as, for instance, soldering or adhesive bonding. Flexure 132 and its attached lens 135 and isolator 136 are then picked and dropped in rough alignment on optoelectronic assembly 100. At this point, flexure 132 simply rests on plate 130. Laser diode 122 is already attached to platform 121 and defines an optical axis, with respect to which lens/isolator and their optical axis will be aligned using flexure 132. In one embodiment, laser diode 122 is attached on platform 121 before flexure 132 is aligned. In one embodiment, flexure 132 is designed such the optical axis of lens 135 and isolator 136 is higher than optical axis of laser diode 122.

A removable alignment tool shown in FIG. 3 is used to apply pressure to the top of the bridge of flexure 132. Other tools, designed by one skilled in the art, can provide the ability to temporarily clamp onto the flexure and apply pressure on the bridge. For example, matching sets of grooves in the flexure and the tool can be used. Similarly the pin and hole interlocking design such as shown in U.S. Pat. No. 6,207,950, entitled "An Optoelectronic Assembly Having a Flexure for Maintaining Alignment Between Optical Elements," issued Mar. 27, 2001, may be used, or a vacuum tool acting as a suction grip can also be used.

During the fine alignment step, tool 301 is lowered onto flexure 132 as shown in FIG. 3, thereby applying pressure on flexure 132, causing its flexing spring regions to push out the flexure legs under the pressure. This, in turn, causes the legs of flexure 132 to spread apart and to lower its optical axis with that of the laser diode. Tool 301 may also be moved in a plane parallel to the plane of welding plate 130, dragging flexure 132 its legs along with it until lateral and longitudinal alignment the optical axis of both the laser diode and the lens/isolator are on the same axis. In one embodiment, alignment can be monitored by measuring coupled power at the output of the optical fiber while the laser is powered up and flexure 132 undergoes fine alignment.

Once desired alignment is obtained, the leg of the flexures are attached to plate 130. One attachment process is laser microwelding through the use of a laser, which creates welding spots on the legs of the flexure and potentially plate 130, to attach the flexure legs to plate 130. Other attachment processes may also be used, such as, for example, UV curable adhesives or soldering. After final attachment of the legs is complete, the tool is raised from the assembly, leaving lens and isolator of flexure 132 aligned with laser diode.

The alignment process for aligning optical fiber 134 with the optical axis on which laser diode 122 and lens 135 reside begins by first attaching optical fiber 134 to the bridge of flexure 131 by a process such as, for instance, soldering or adhesive bonding. Flexure 131 and its attached optical fiber 134 are then picked and dropped in rough alignment on optoelectronic assembly 100. At this point, flexure 131 simply rests on welding plate 130. The laser diode is already attached to submount and defines an optical axis, with respect to which optical fiber and its optical axis will be aligned using flexure 131 and lens 135/isolator 136 and their optical axis will be aligned using flexure 132. In one embodiment, flexure 131 is designed such its optical axis is higher than optical axis of laser diode 122. In one embodiment, the optical axis of the optical fiber is about 100 to 200 microns higher than the optical axis of laser diode when no pressure is applied on flexure 131.

Figure 17:
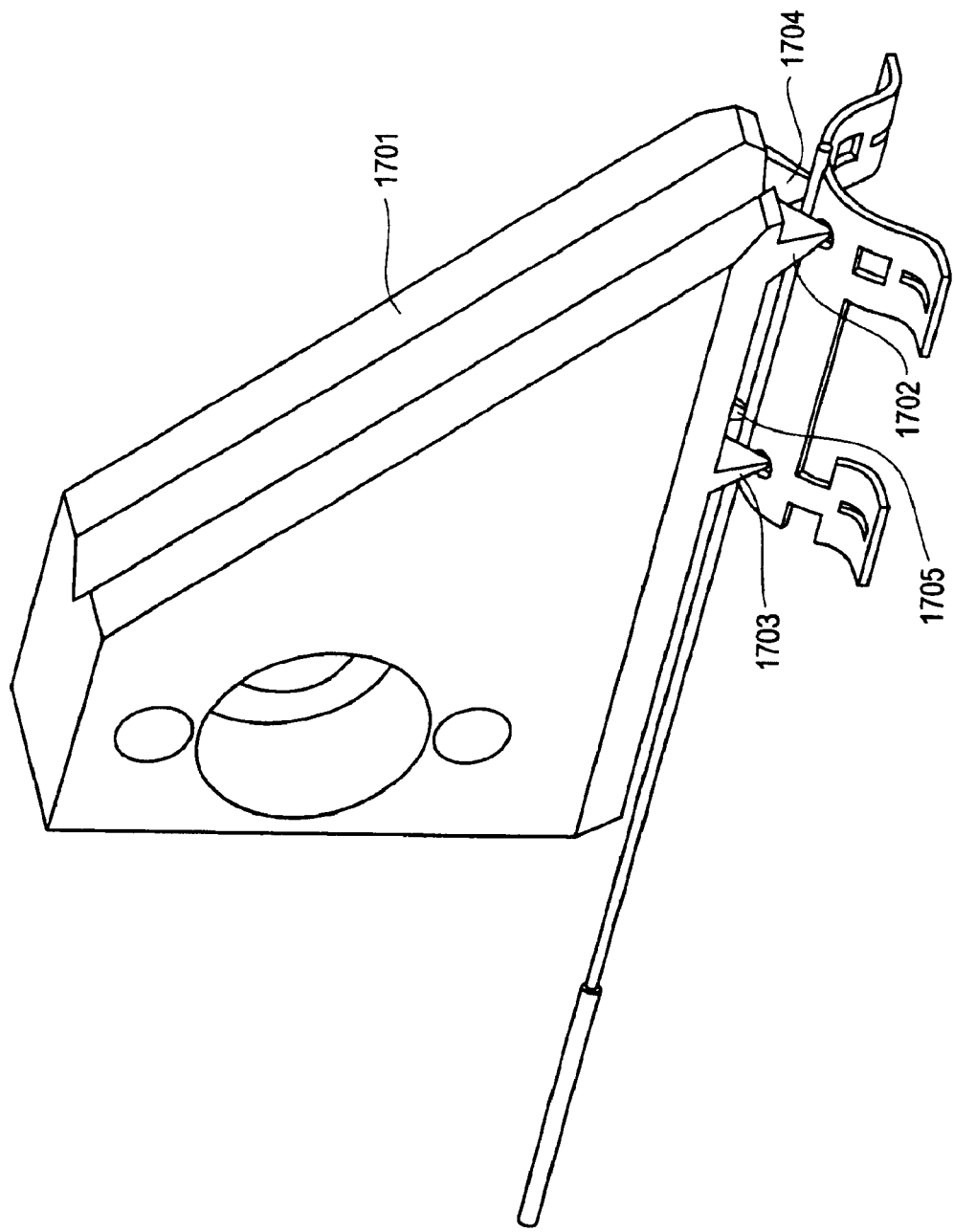
FIG. 17 illustrates one embodiment of the manufacturing tool shown positioning a flexure.

A removable alignment tool 1701 shown in FIG. 17 is used to apply pressure to the top of the bridge of flexure 131. Tool 1701 also includes four pins, of which are shown as pins 1702–1705, that fit into matching gripping holes on the bridge of flexure 131. It should be clear that the shape of the alignment tool in FIG. 17 is just given as an example. Other tools, designed by one skilled in the art, can provide the ability to temporarily clamp onto the flexure and apply pressure on the bridge. For example, matching sets of grooves in the flexure and tool can replace the pin and hole interlocking design, or a vacuum tool acting as a suction grip can also be used.

During the fine alignment step, tool 1701 is lowered onto the flexure bridge, thereby applying pressure on the bridge. This causes the flexing spring regions to bend under the pressure. This, in turn, causes the flexure legs to spread apart and to lower its optical axis with that of the laser diode. Tool 1701 is also moved in a plane parallel to the plane of the plate, dragging the legs of flexure along with it until lateral and longitudinal alignment the optical axis of both the laser diode and the optical fiber are on the same axis. In one embodiment, alignment can be monitored by measuring coupled power at the output of the optical fiber 134 while the laser is powered up and flexure 132 undergoes fine alignment. Once desired alignment is obtained, the legs of flexure 132 are attached to the plate.

Note that although embodiments of optoelectronic packages are described herein having one or more optical elements on plates, risers, submounts or other types of platforms, it is well within the teaching of the present invention to position such components on the package floor while having other optical elements of the package mounted below the top surface of the package floor.

Although the detailed description contains many specifics for the purposes of illustration, one of ordinary skill in the art will appreciate that many variations and alterations to the following details are within the scope of the invention.

For flexure 132 having a single pair of legs, the alignment method described for the two-leg flexure assembly may be used to attach the flexure. Referring to FIG. 2, flexing spring regions 202 connect the legs 220 to the bridge 139 of the two-legged flexure 132. Flexure 132 may then be annealed to confer spring properties to the material. In one embodiment, the two-legged flexure 132 is approximately 0.17 mm thick and flexing spring regions 202 are approximately 0.08 mm thick.

Table 1 below summarizes a variety of exemplary flexures available for use to position optical or optoelectric elements such as lenses, fibers, lasers, and gratings.

TABLE 1

Figure 4:
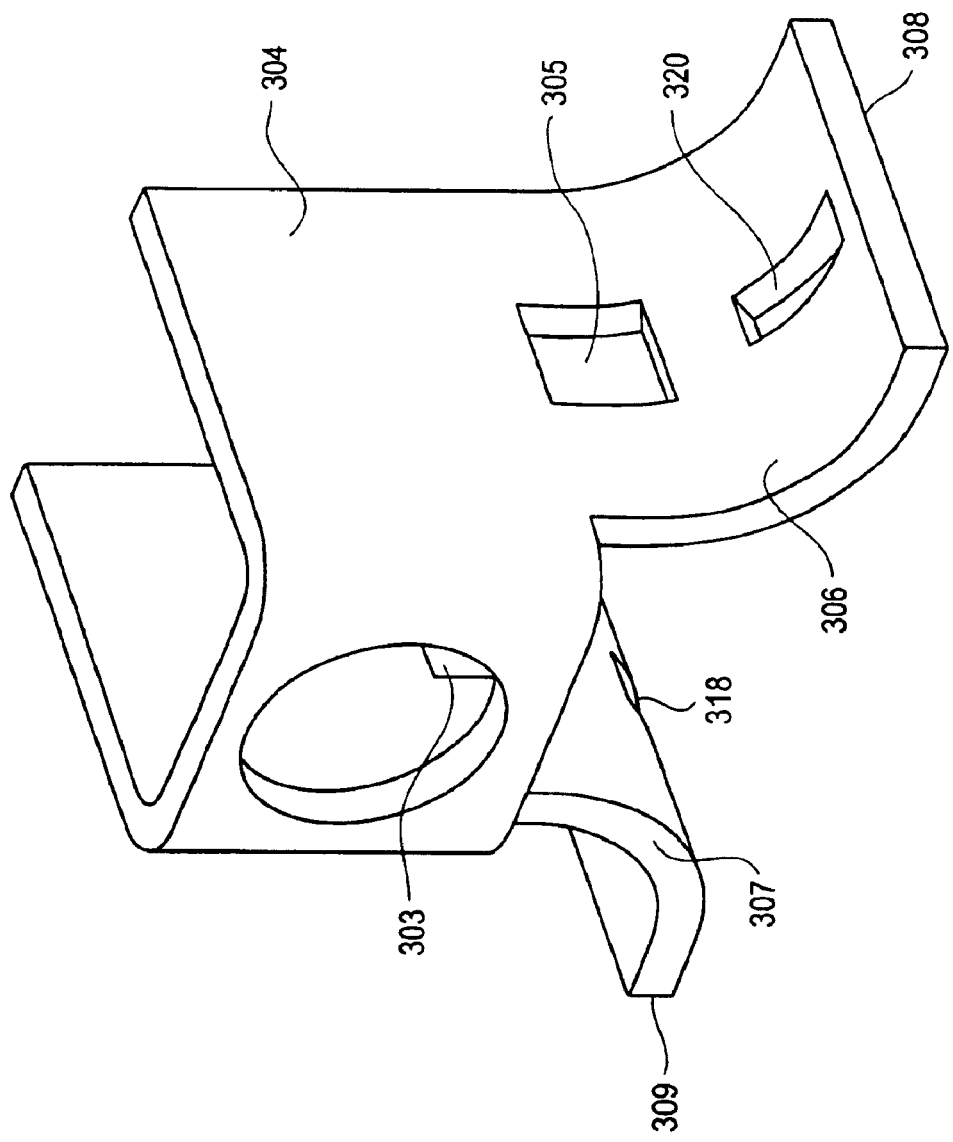
FIG. 4 shows an embodiment of a single component flexure comprised of a "U"-shape bracket with two legs.

| Flexure Illustration | Flexure Features |
|---|---|
| FIG. 4 | Optical Component Support: "U"-shape bracket 304, square handling features 303 and 305, two legs 308 and 309, flexing spring regions 306 and 307, 310, 310', 311, and 311' |
| FIG. 5 | Optical Component Support: "L" shape bracket having vertical surface 328 and horizontal surface 324 to mount optical elements, radiused handling features 320 (radius 326), two legs 321 and 322 attached beneath, and flexing spring regions |
| FIG. 6 | Optical Component Support: asymmetric "U"-shape bracket 390 with vertical surface 392 and horizontal surface 394, a long side as an overhang to mount multiple optical elements, and two legs, which have extended depth, attached beneath |
| FIG. 7 | Optical Component Support: two legs and horizontal surface to mount a base, flexing spring regions and horizontal surface have same thickness; and Base: vertical surfaces to mount an optical element and an opposing channel to attach a second optical element within, subtracted radius corners 334 and 334' for handling or use vertical surfaces 330 and 332 |
| FIG. 8 | Optical Component Support: two legs and horizontal top surface to attach a base and horizontal bottom surface to mount an optical element, with flexing spring regions; and Base: Inverted "U"-shape draping over flex-frame with vertical surfaces to mount optical element(s) and four corners subtracted by a radius for handling or use vertical surfaces |
| FIG. 9 | Optical Component Support: two legs and horizontal surface to attach a base, with flexing spring regions; and |

TABLE 1-continued

Figure 10:
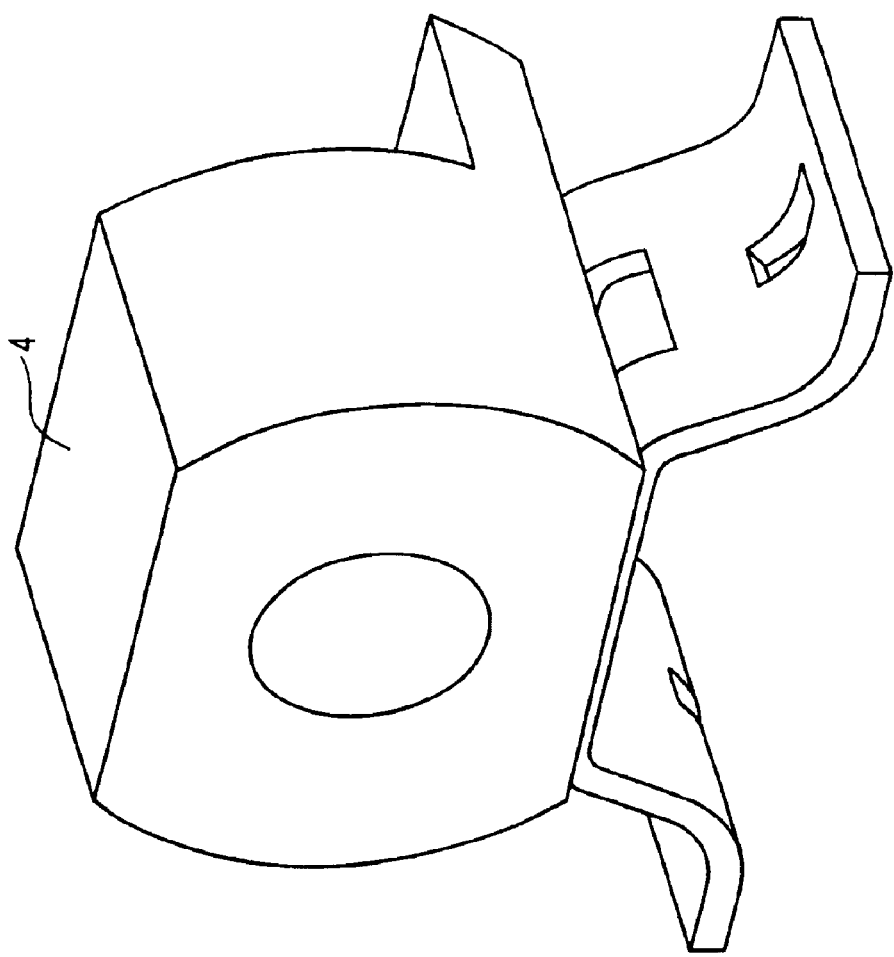
FIG. 10 shows an alternate embodiment of the dual component flexure having a cylindrical-shape base with a flat surface for suction grip and a flat surface for mounting an optical element.
Figure 11:
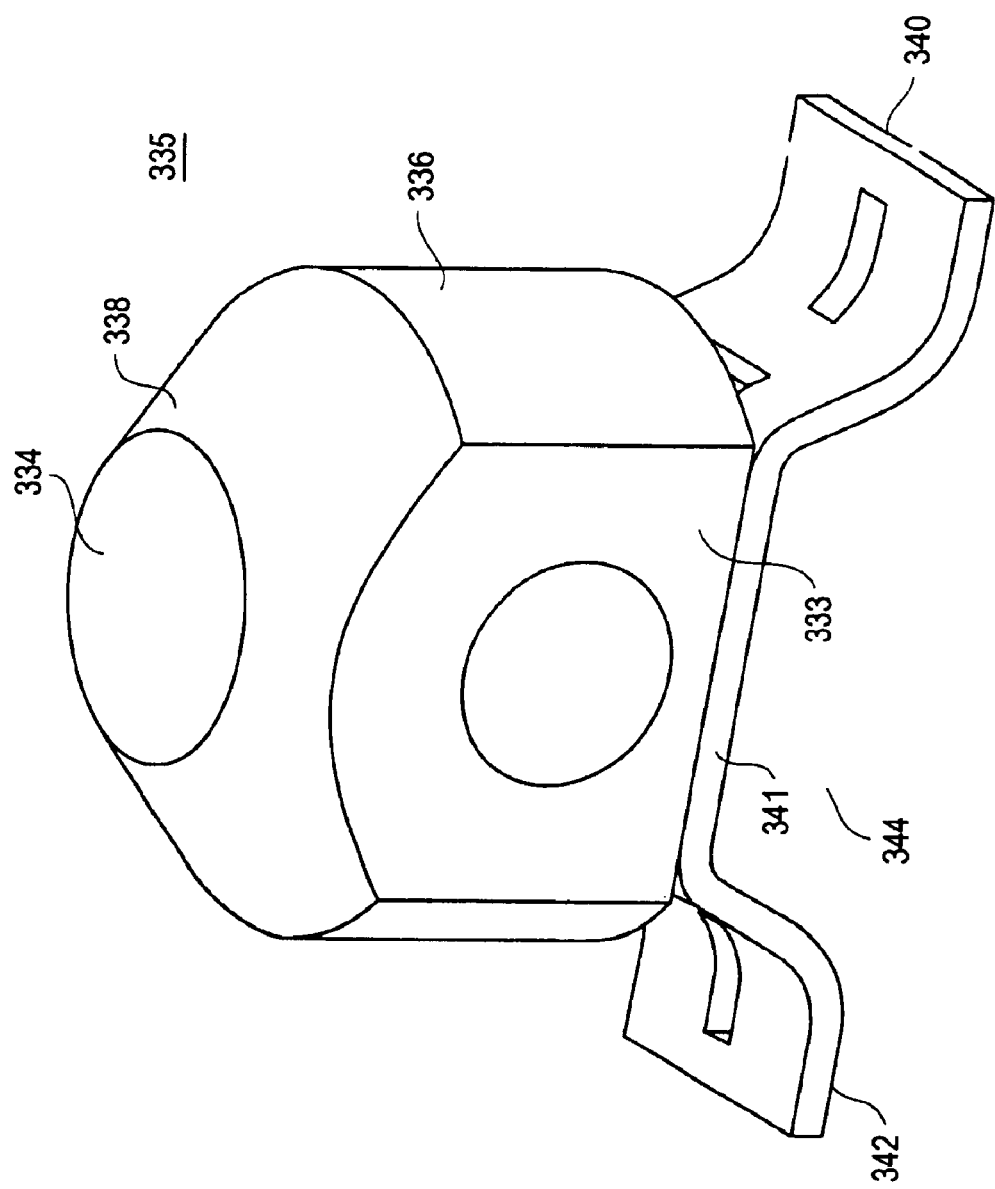
FIG. 11 shows an alternate embodiment of the dual component flexure having the cylindrical-shape base with a conical top for the suction grip.
Figure 12:
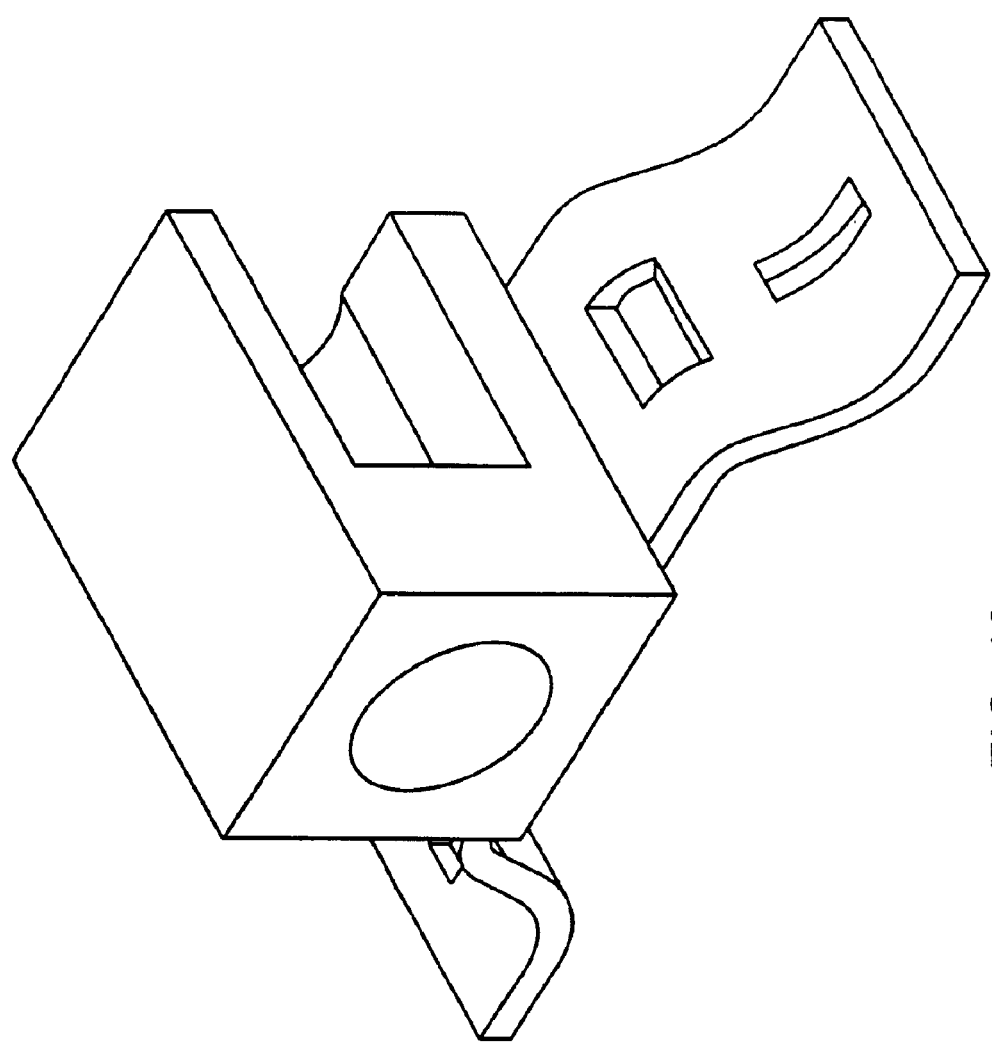
FIG. 12 shows an alternate embodiment of the dual component flexure having a "C"-shape base for mounting multiple optical elements.
Figure 13:
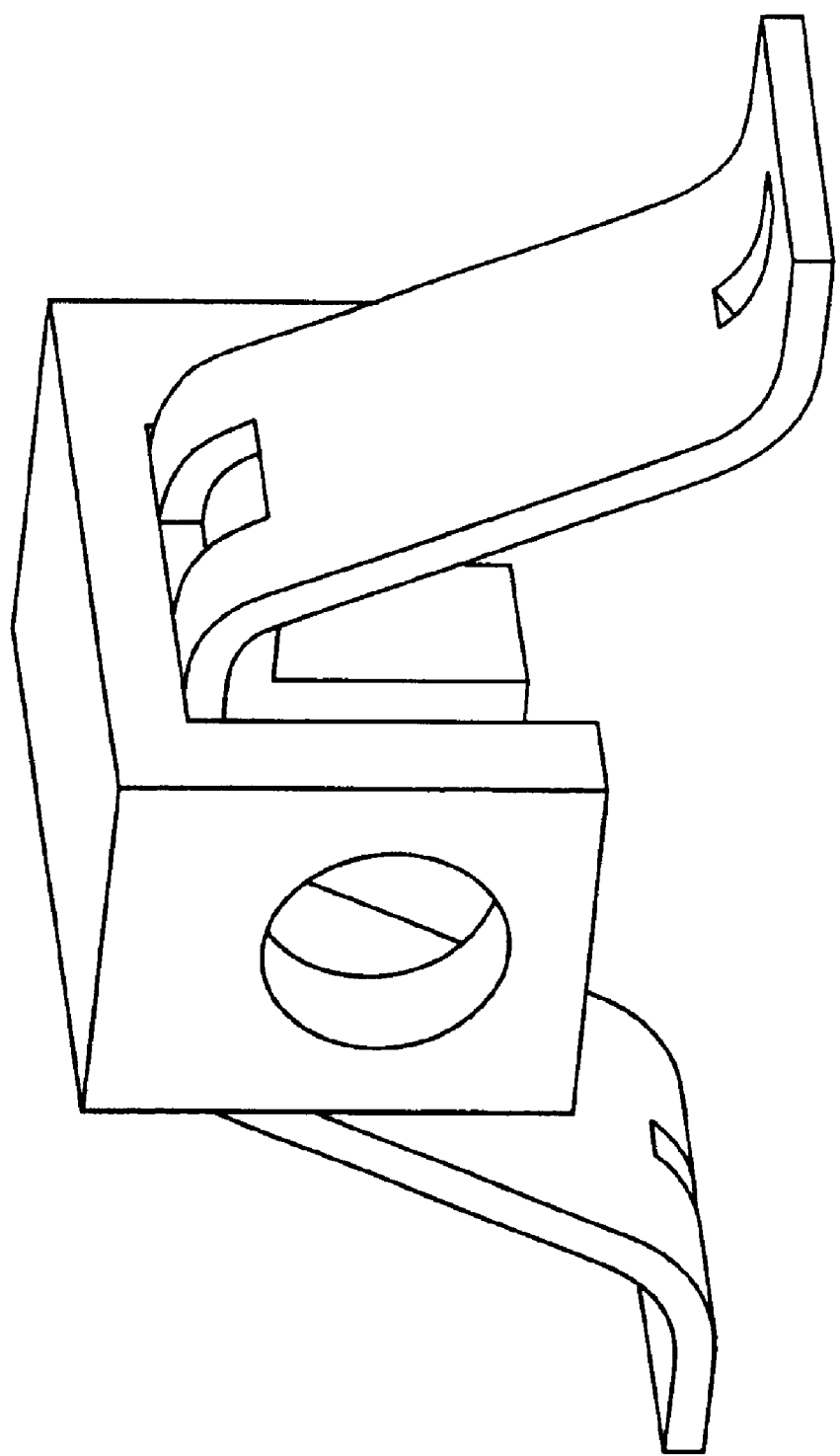
FIG. 13 shows an alternate embodiment of the dual component flexure having an inverted "U"-shape base draped over a two-legged structure.
Figure 14:
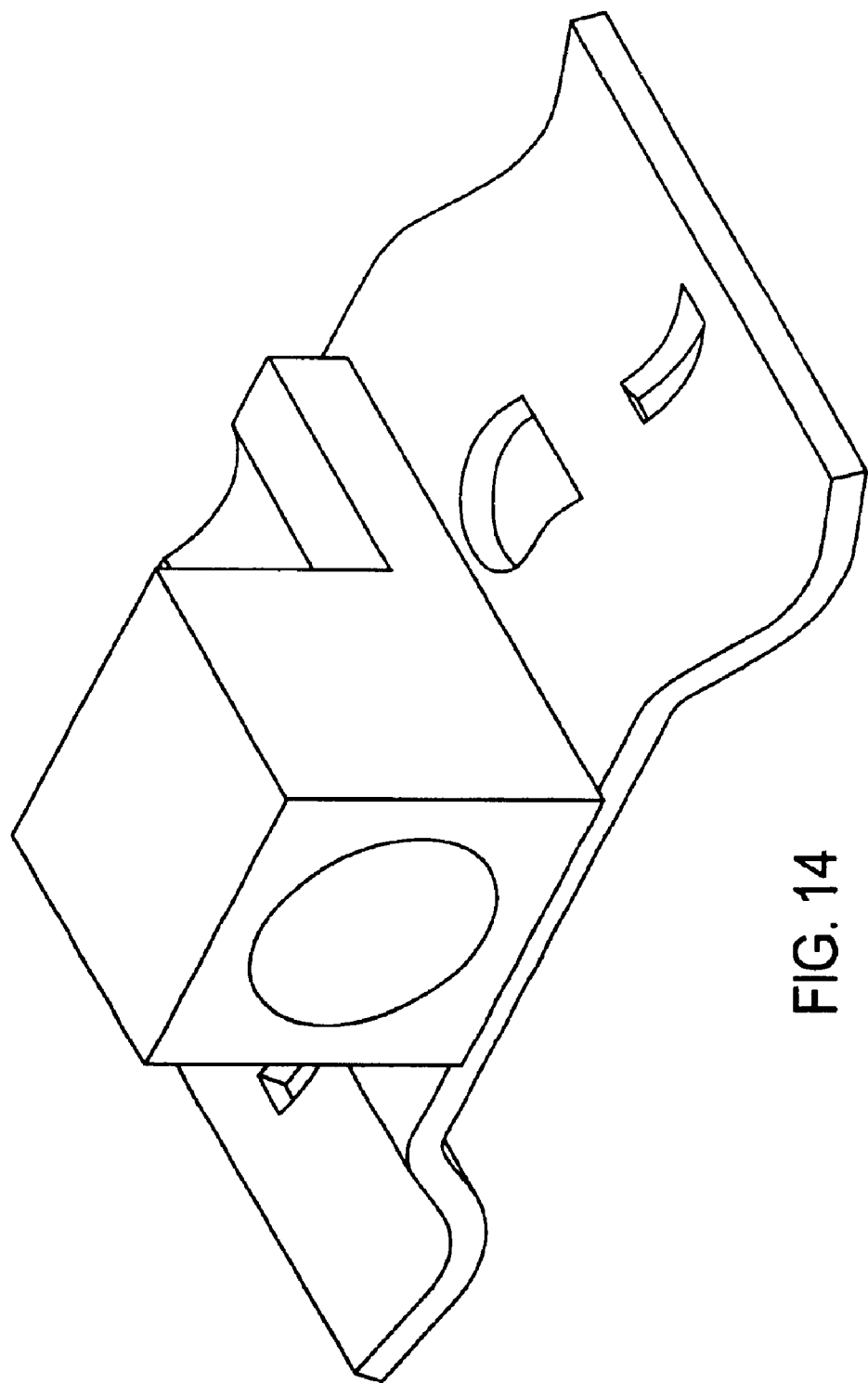
FIG. 14 shows an alternate embodiment of the dual component flexure having an extended depth "L"-shape base with a two-legged optical component.

| Flexure Illustration | Flexure Features |
|---|---|
| | Base: cube with vertical surfaces for mounting optical element(s) and handle |
| FIG. 10 | Optical Component Support: two legs and horizontal surface to mount a base, flexing spring region; and Base: cylindrical shape with an extension, having a vertical surface to mount an optical element, a horizontal extension to mount an optical element, a flat surface subtracted at top of base for suction handling or handle at curved sides |
| FIG. 11 | Optical Component Support: two legs 340 and 342 and horizontal surface 341 to mount a base 336, with flexing spring regions; and Base 336: cylindrical shape with a conical radius 338 top, conical radius 338 having a horizontal flat surface 334 for suction handling, the cylindrical shape having a vertical flat surface 333 for mounting an optical element, handling also on curved sides |
| FIG. 12 | Optical Component Support: two legs and a horizontal surface to mount a base, with flexing spring regions; and Base: "C"-shape block with vertical and horizontal surfaces to mount optical element(s), manufacturing groove may be used for optical fiber clearance and/or attachment, handling at sides of block or suction handle at top |
| FIG. 13 | Optical Component Support: two longer legs and horizontal top surface to mount a block and horizontal bottom surface to mount an optical element, withflexing spring regions; and Base: Inverted "U"-shape draping over component support, having extended depth with single leg containing optical through-hole at one end and two legs opposite, vertical surfaces for optical elements, handling on vertical surfaces or suction handle at top surface |
| FIG. 14 | Optical Component Support: two legs and horizontal surface to attach a base, radiused handling features, with flexing spring regions; and Base: "L"-shape block with overhand having vertical and horizontal surfaces for mounting optical element(s), manufacturing groove in horizontal surface may be used for optical fiber clearance and/or attach |
| FIG. 15 | Optical Component Support 518: two legs 514 and 516 having "V" features 512 within for handling, and a horizontal surface 511, spring regions 508, 508', 510 and 510' are same thickness as overall optical component support518; and Base 513: "L"-shape block 513 attached with overhang above the component support 518, vertical 520 and horizontal 522 surfaces to mount optical element(s), manufacturing groove 524 in horizontal surface 522 may be used for optical fiber clearance and/or attach |
| FIG. 16 | Optical Component Support: two legs and a rectangular horizontal bridge surface 804 having four corners subtracted by a radius 802 and 802' for handling, with flexing spring regions; and Base: "L"-shape block attached above the component support, vertical and horizontal surfaces to mount optical element(s) |

Table 1 above lists a variety of shapes for flexures to place in alignment one or more optical elements with an optical axis of an optical signal such as a laser. The variety of shapes of flexures can include a variety of structures to act as support for mounting one or more optical elements. The structures may be at any angle necessary to provide the desired alignment of the mounted optical elements with an optical axis. For example, surfaces on the structure may be at an angle that is 90 degrees from a substrate floor. Alternatively, one or more of the surfaces may be angled anywhere between 0 and 90 degrees to meet optical axis requirements by compensating for an angled feature of the optical element.

Figure 5:
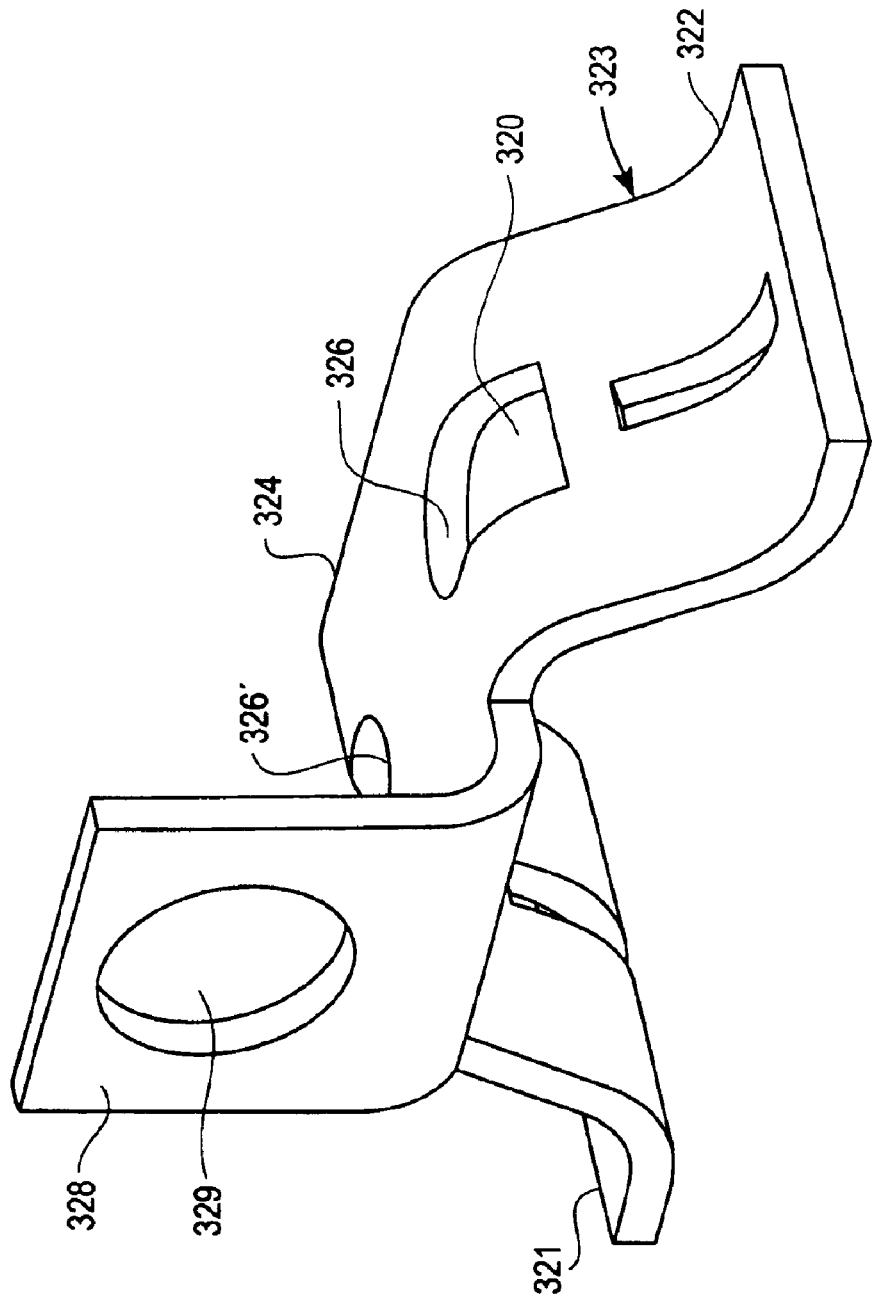
FIG. 5 shows an alternate embodiment of the single component with an "L"-shape bracket and two legs.
Figure 6:
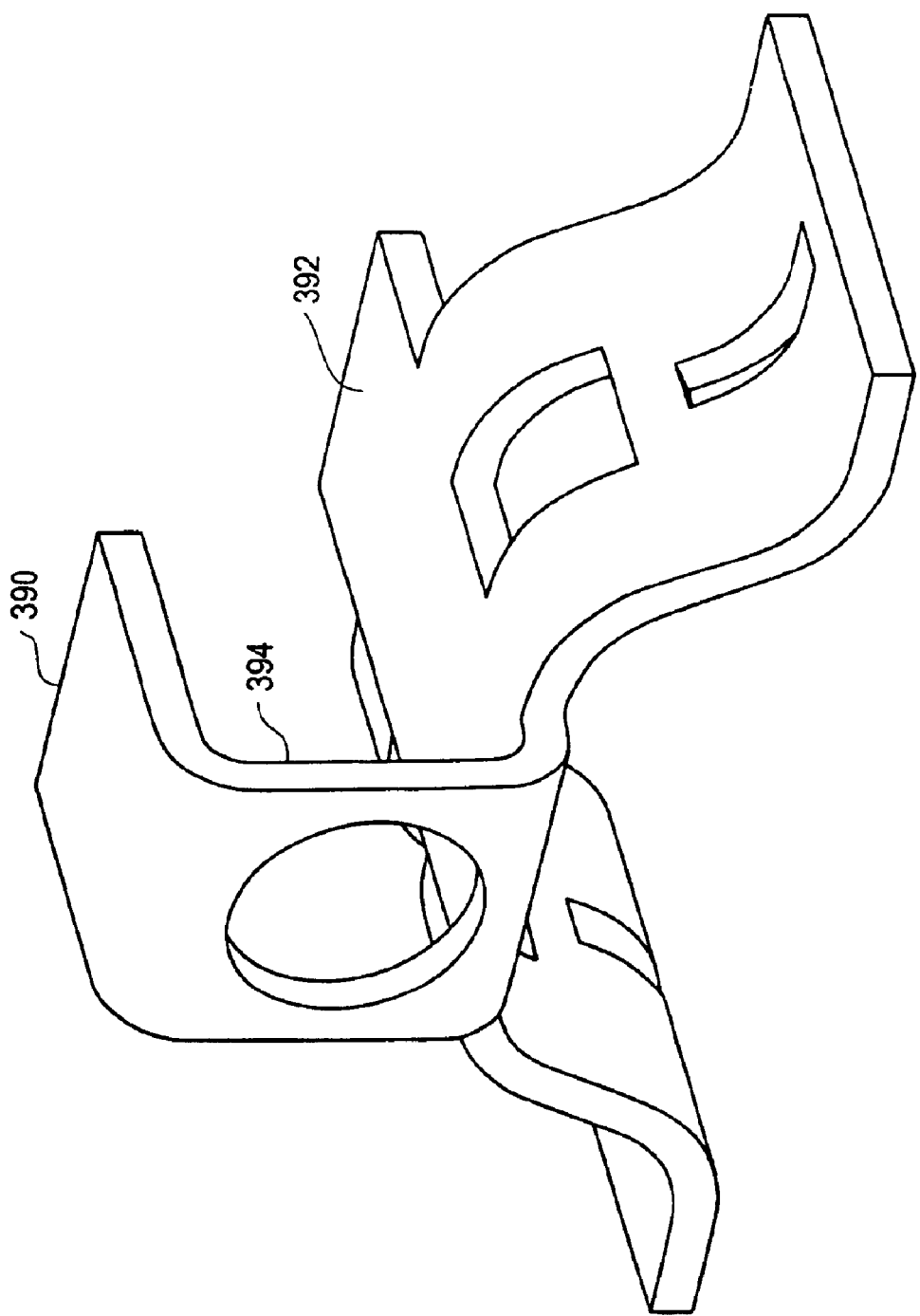
FIG. 6 shows an alternate embodiment of the single component flexure with an asymmetric "C"-shape bracket and two legs.

As described in Table 1 and FIGS. 4–6, the single component flexure is constructed from one component and can mount one or more optical elements. These optical elements may be a combination of lenses, optical emitters, and optical fibers. The single component flexure may have one or more legs, may incorporate one or more flexing spring regions, may allow fine adjustments in more than one plane, and may make use of several types of handling and self-leveling features.

As described in Table 1, and FIGS. 7–16, a multi-component flexure is constructed from at least two components to mount one or more optical elements. These optical elements may be a combination of lenses, optical emitters, and optical fibers. The multi-component flexures have the advantage, over the single component flexures, of being able to provide more surfaces on which to mount optical elements. Any number of components may be used to make up a flexure depending on requirements; however for clarity, only a dual component flexure is discussed for the multi-component flexure designs. Note that in alternative embodiments, these flexures capable of securing multiple optical elements may be created out of a single component.

The dual component flexures are comprised of the basic optical component support on which is attached a base. The dual component flexures can have any of the same features and shapes available to the single component flexure along with additional features that are available from the addition of the base. The base may begin as a rod or a block and have surfaces removed to provide features that are not available with single component construction. In addition, vertical surfaces on the base may be manufactured to tighter tolerances (a higher degree of accuracy) than can be formed from vertical surfaces that are bent in place as is the case for the single component flexures.

Highlights of some of the design aspects on particular flexures will be discussed to provide an understanding of the individual features that may be on a single and/or dual component flexure. It is to be appreciated that many of these features can be "mixed and matched" on a flexure to provide the capabilities needed to meet the particular requirements of an optical package.

FIGS. 4–6 represent embodiments of the single component flexure. As shown in FIG. 4, a "U"-shape bracket 304 is formed to provide structural stability and an attachment bridge for the legs 308 and 309. Flexing spring regions 306 and 307, when vertical alignment forces are applied, can be a function of the flexing spring regions their thicknesses, width, and length. In the case for all three dimensions, each dimension may be varied over a distance of one of the other dimensions. In addition, the design of each flexing spring region on a single flexure may be different by using different dimensions for each flexing spring and thus the overall flex characteristics of each flexing spring region are different.

FIG. 5 is an alternate embodiment of a single component flexure. As shown in FIG. 5, a top surface 324 replaced the "U"-shape bracket 304 and two (i.e. features containing a radius in their geometry) features for handling have been added 326 and 326'. Flexures may use at least one through-hole to allow an optical signal to pass and with this embodiment, a single through-hole 329 exists in bracket 328. Flexure legs 322 and 321 may be curved, such as with a radius 323, to allow the leg free ends to slide on a contact surface with the application of a vertical force during the alignment process.

In an embodiment, when flexed a flexing spring region (not shown) may bow uniformly and uniformly spread stresses over the volume of the hinge. Alternatively, when a flexure is vertically depressed during alignment, the flexing spring region may bend or deform non-uniformly causing more of the stresses to concentrate at a local point within the flexing spring region. This could produce yielding or local buckling in the hinge material causing unexpected results in the flexing spring behavior. Changing flexing spring region thicknesses, or widths in the area of greatest potential deformation (i.e. highest stresses) during flexure of the flexing spring region may reduce and/or shift stresses along the flexing spring region, thereby limiting the deformation.

Figure 15:
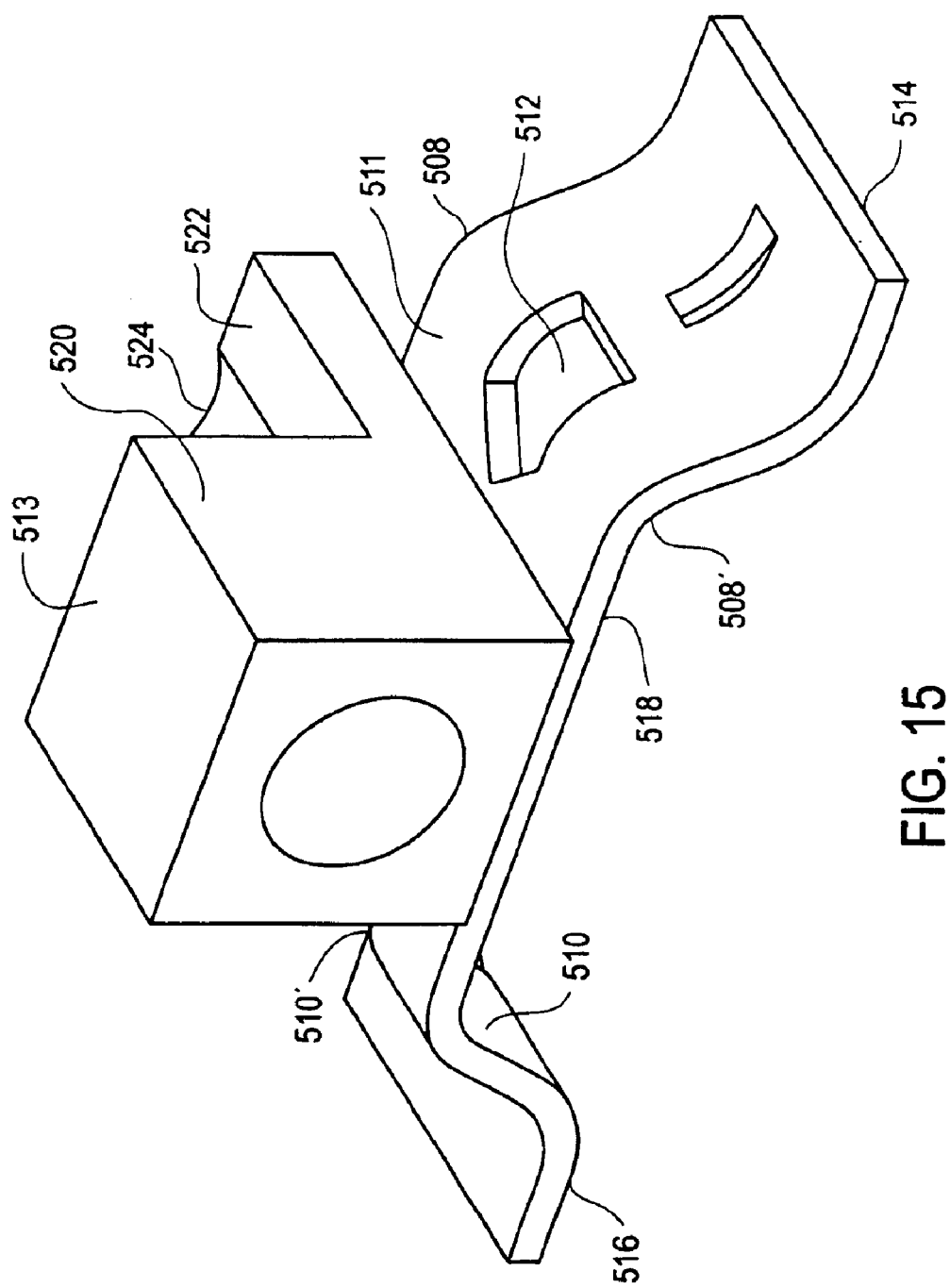
FIG. 15 shows an alternate embodiment of the dual component flexure having an extended depth "L"-shape base with a two-legged optical component support with "V"-shape handling features.
Figure 16:
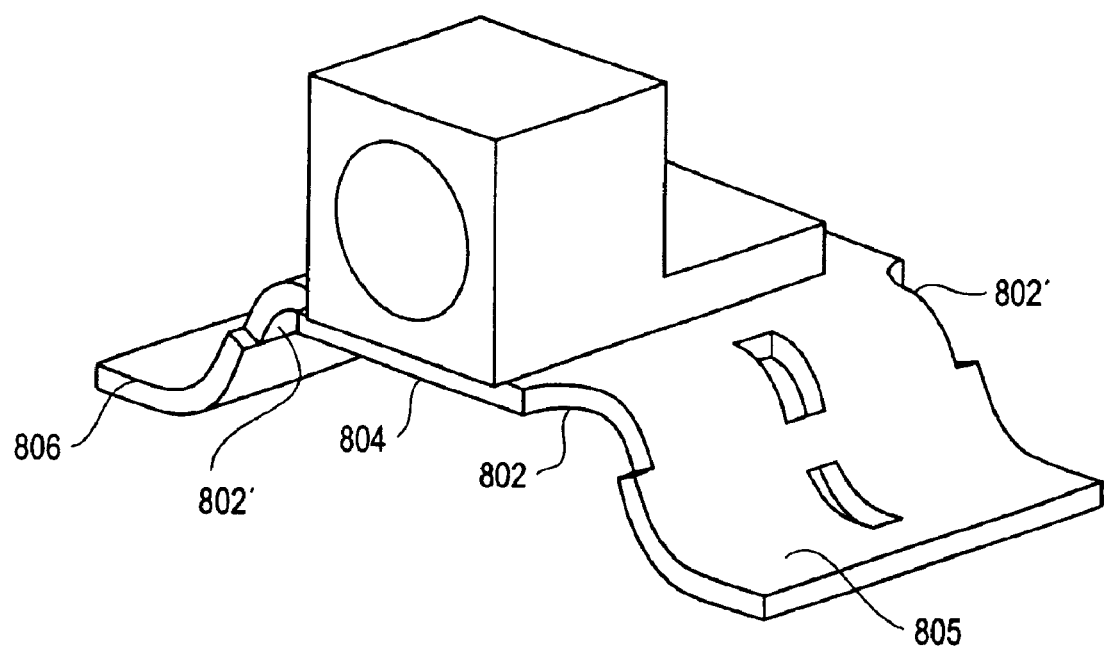
FIG. 16 shows an alternate embodiment of the dual component flexure having an "L"-shape base and two-legged optical component support with chamfered corners for handling.

FIG. 15 illustrates flexing spring regions 508, 508', and 510, 510' that are constructed by placing a handling feature 512 within, and where the flexing springs 508, 508', 510, and 510' have the same thickness as the rest of the optical component support 514.

Handling features may take on a variety of shapes. In an embodiment as shown in FIG. 5, the handling feature is a pair of features 320 (one shown) in the flexure leg 322—bridge 324 junction having a radius 326 that can accept a curved grip feature that is part of the alignment tool (not shown). Depending on the difference between the two radii (flexure slot radius vs. radius of the grip), an area of the grip feature will contact radius 326 of flexure slot 320.

In the embodiment shown in FIG. 15, the handling slot 512 has a "V"-shape surface that will contact the curved grip feature and provide either a two-point contact or three points of contact. In another embodiment, referring back to FIG. 6, the flexure handling slot 305 is rectangular and the tool grip may be a radius or a rectangle. The number of contact points between the grip and the flexure handling slot in this case can vary depending on the design intent as evidenced in the dimensioning of the two parts.

Figure 9:
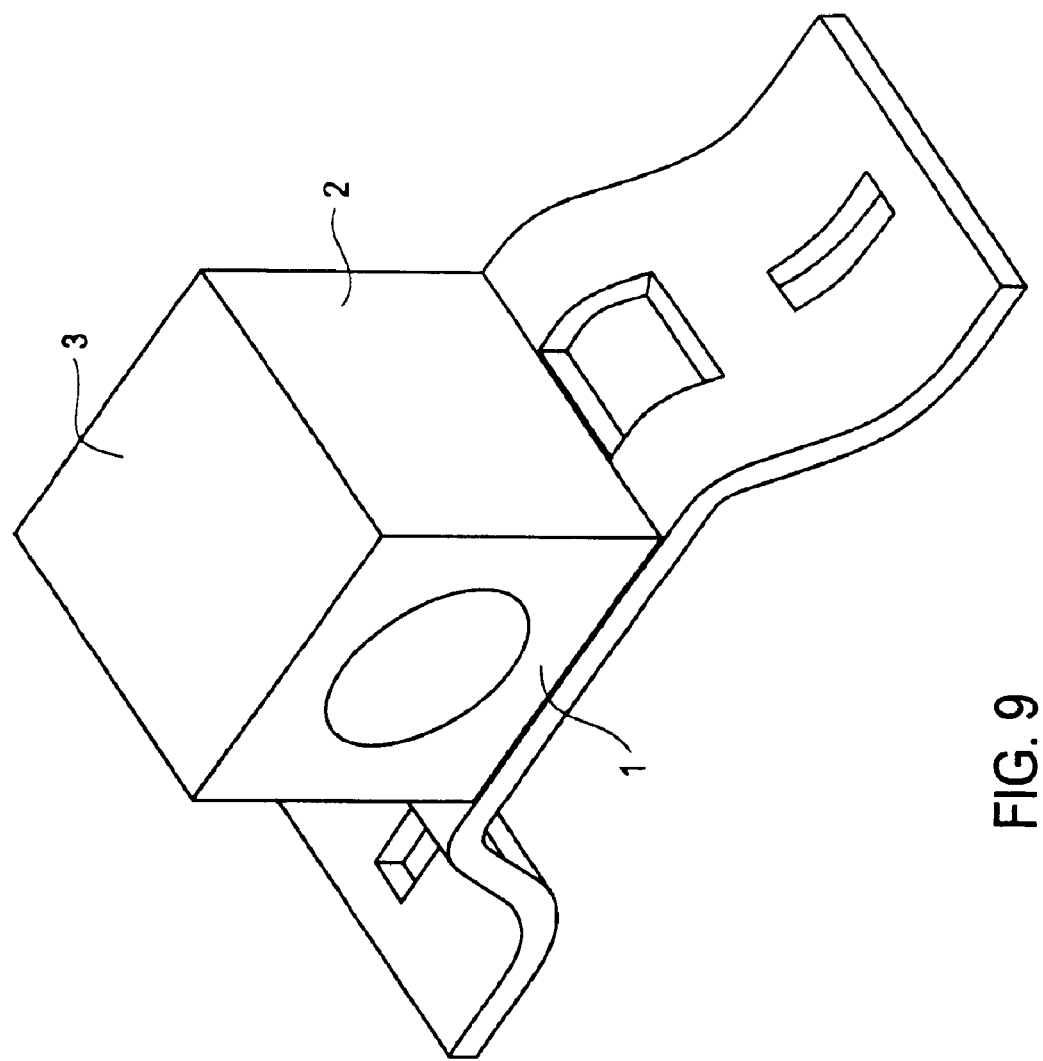
FIG. 9 shows an alternate embodiment of the dual component flexure with a cube base to provide vertical surfaces for mounting optical elements.

In an embodiment, as shown in FIG. 9, the attachment feature may be vertical surfaces 1 and 2 that a tool grip (not shown) can compress against and hold during the alignment process. In an embodiment, as shown in FIGS. 9 and 10, the attachment feature may have one or more flat surfaces 3 and 4 against which to position a vacuum or suction grip device.

Figure 7:
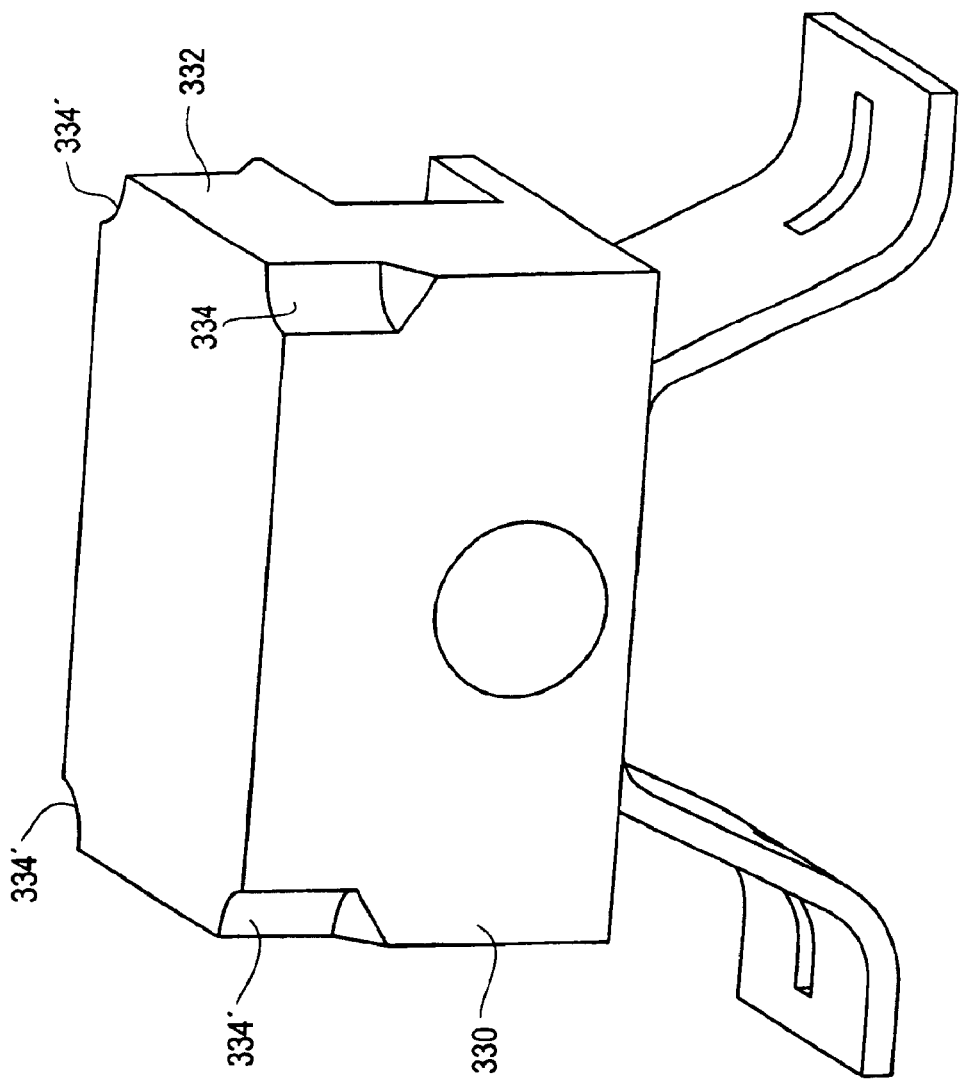
FIG. 7 shows an embodiment of a dual component flexure with a optical component support having two legs and a base having a channel to mount optical elements and subtracted radius corner features for handling.
Figure 8:
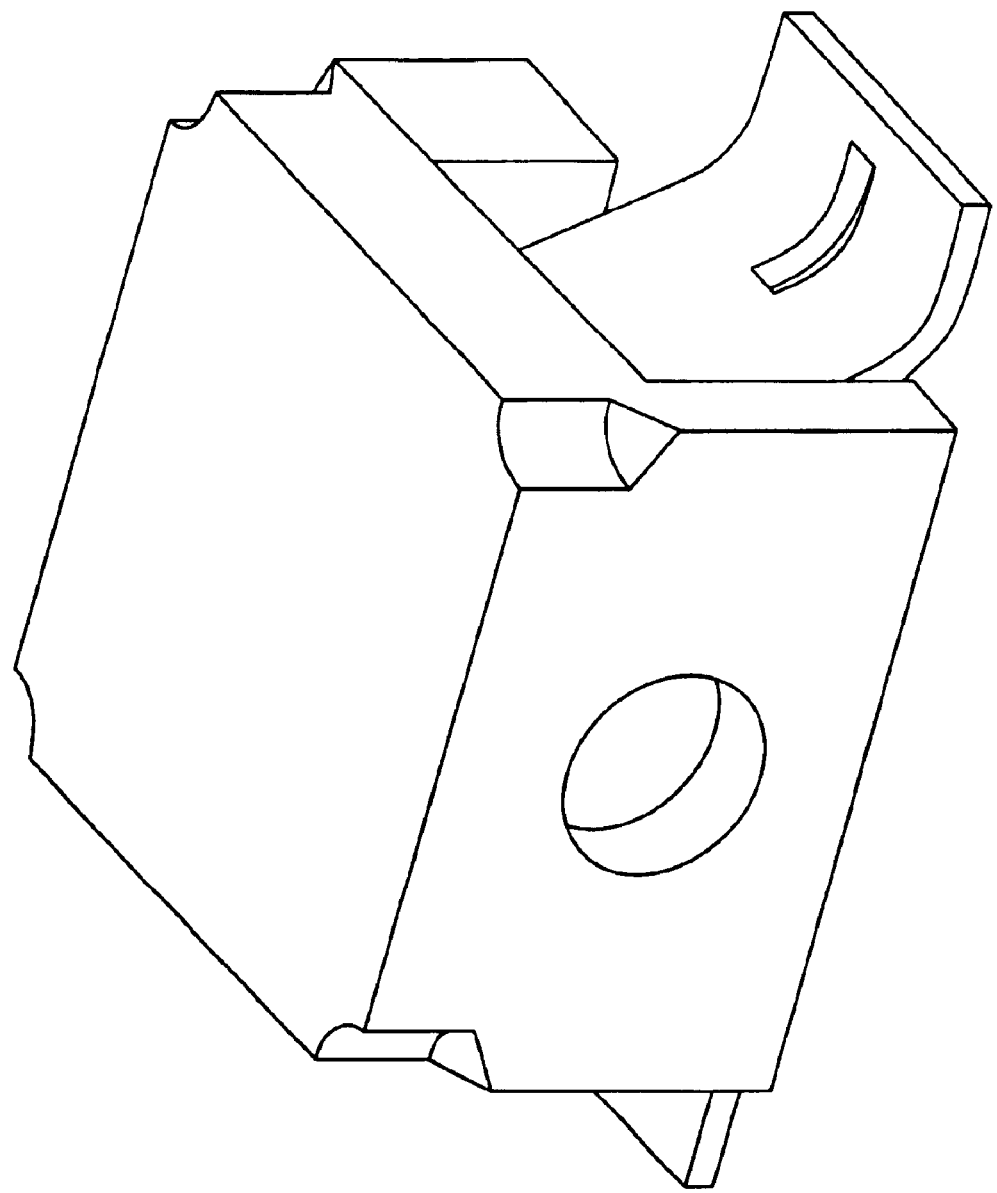
FIG. 8 shows an alternate embodiment of the dual component flexure with an inverted "U"-shape base providing vertical surfaces for mounting optical elements, and subtracted radius corner features for handling.

Referring to FIG. 7, in an alternate embodiment, the handling features are placed at the four corners (now removed) of a flat bracket 804 joining two legs 805 and 806. The four corners are chamfered so as to provide four flat surfaces 802 and 802' to mate with a handling feature 53 to 56 of an alignment tool 301 to during placement and alignment of the flexure 132.

A purpose of the different handling feature designs is to allow various degrees of freedom for rotation when the flexure is placed in contact with a surface during alignment. If, by proper positioning of the legs within a flexure, a self-leveling feature is desired, fewer stresses are likely to be placed within the flexure after alignment and attachment to a substrate surface. As a result, a flexure is less likely to shift slightly after the attachment process and add to any miss-alignment of optical elements along an optical axis.

Referring again to the single component flexures in FIGS. 4–6, where the flexure can be manufactured from a single piece of material. As described above, a metal flat pattern may be fabricated using fabrication methods such as die stamp, laser cut, and/or chemical etch and then secondarily bent and/or etched to a three-dimensional shape. Further heat treatment may be applied to provide a modulus chosen for the metal.

FIG. 11 illustrates an embodiment of a dual component flexure. Shown in FIG. 11, one end of the base 336 is a spherical radius 338. The spherical radius 338 can mate with a grip tool (not shown) having a spherical radius mating surface. As a result, flexure 335 can pivot about the center point of this sphere 338 to allow the legs 340 and 342, as they contact surface 344, to self-level.

Flexures may have a number of flexure legs and may be used in a variety of shapes.

FIG. 6 illustrates an embodiment of a flexure having an asymmetric "U"-shape bracket 390. The asymmetry exists to provide visual access from a "top-down" view to one or more lens(es) (not shown) positioned within the "U" (on bracket 390 vertical surface 392 and/or horizontal surface 394) during the alignment process.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them recite only those features regarded as essential to the invention.

We claim:

1. A package comprising:

one or more surfaces; and a first flexure having a first base attached to the one or more surfaces, the first flexure having a body coupled to a plurality of legs via flexing spring regions, the flexing spring regions enabling legs of the plurality of legs on opposite sides of the body to spread further apart in response to a force on the body when not attached to the one or more surfaces; and at least two optical elements coupled to the first base of the flexure, the first base having at least one vertical surface to mount an optical element thereon perpendicular to an optical axis, wherein the optical element is one selected from the group that includes a laser, a lens, a modulator, a filter, a beam splitter, an isolator, a polarizer, a detector, and a grating.

2. The package in claim 1 further comprising a second flexure, wherein the second flexure comprises:

an optical component support having a pair of legs on opposite sides of a horizontal surface with a flexing spring region between each leg and the horizontal surface; and a second base having a vertical surface to mount a first optical element and a channel having an opening opposite the vertical surface on the second base for coupling a second optical element.

3. The package in claim 2 wherein the second base further comprises subtracted radius corners for handling the flexure.

4. The package in claim 1 further comprising a second flexure, wherein the second flexure comprises:

an optical component support having a pair of legs on opposite sides of a horizontal surface with a flexing spring region between each leg and the horizontal surface; and a second base having an inverted U-shape draping over the optical component support with a least one vertical surface to mount an optical element.

5. The package in claim 4 wherein the second base includes a horizontal surface and a plurality corners of the base have extracted circular regions for handling.

6. The package in claim 1 wherein the first flexure comprises:

an optical component support having a pair of legs on opposite sides of a horizontal surface with a flexing spring region between each leg and the horizontal surface; and wherein the first base comprises a cube with an opening along the optical axis and including one or more vertical surfaces for mounting optical elements.

7. The package in claim 1 wherein the first flexure comprises:
an optical component support having a pair of legs on opposite sides of a horizontal surface with a flexing spring region between each leg and the horizontal surface; and wherein the first base comprises a rod-shaped portion with an extension having a vertical surface to mount the optical element thereon and a horizontal extension to mount the optical element thereon.

8. The package in claim 1 wherein the first flexure comprises:
an optical component support having a pair of legs on opposite sides of a horizontal surface with a flexing spring region between each leg and the horizontal surface; and wherein the first base comprises a rod-shaped base with a spherical radius top with a horizontal surface thereon for suction handling, wherein the rod-shaped base includes a vertical surface for mounting the optical element thereon and curved side surfaces for handling.

9. The package in claim 1 wherein the first flexure comprises:
an optical component support having a pair of legs on opposite sides of a horizontal surface with a flexing spring region between each leg and the horizontal surface; and wherein the first base comprises a C-shaped base with a vertical surface to mount the optical element as well as a cavity the opposite side of the first base in relation to the vertical surface, the cavity for mounting an optical element.

10. The package in claim 1 wherein the at least two optical elements are aligned with an optical axis.

11. The package of claim 1 wherein the first base includes a semi-circular portion.

12. The package of claim 11 further comprising a flat handling surface on the semi-circular portion.

13. The package of claim 1 wherein the first base further comprises a groove for attaching an optical fiber.

14. The package in claim 13 wherein the first base further includes at least two surfaces to attach the at least two optical elements.

15. A package comprising:
one or more surfaces;
a first flexure having a first base attached to the one or more surfaces, a body,
a plurality of legs coupled to the body via flexing spring regions, the flexing spring regions enabling legs of the plurality of legs on opposite sides of the body to spread further apart in response to a force on the body when not attached to the one or more surfaces, and
at least a pair of handling features; and
at least two optical elements coupled to the first base of the flexure and aligned with an optical axis, the first base having at least one vertical surface to mount an optical element thereon perpendicular to the optical axis, wherein the optical element is one selected from the group that includes a laser, a lens, a modulator, a filter, a beam splitter, an isolator, a polarizer, a detector, and a grating.

16. The package in claim 15 further comprising a second flexure wherein the second flexure comprises:
an optical component support having a pair of legs on opposite sides of a horizontal surface with a flexing spring region between each leg and the horizontal surface; and a second base having a vertical surface to mount a first optical element and a channel having an opening opposite the vertical surface on the second base for coupling a second optical element.

17. The package in claim 16 wherein the second base further comprises subtracted radius corners for handling the flexure.

18. The package in claim 15 further comprising a second flexure, wherein the second flexure comprises:
an optical component support having a pair of legs on opposite sides of a horizontal surface with a flexing spring region between each leg and the horizontal surface; and
a second base having an inverted U-shape draping over the optical component support with a least one vertical surface to mount an optical element.

19. The package in claim 18 wherein the second base includes a horizontal surface and a plurality corners of the base have extracted circular regions for handling.

20. The package in claim 15 wherein the first flexure comprises:
an optical component support having a pair of legs on opposite sides of a horizontal surface with a flexing spring region between each leg and the horizontal surface; and wherein the first base comprises a cube with an opening along the optical axis and including one or more vertical surfaces for mounting optical elements.

21. The package in claim 15 wherein the first flexure comprises:
an optical component support having a pair of legs on opposite sides of a horizontal surface with a flexing spring region between each leg and the horizontal surface; and wherein the first base comprises a rod-shaped portion with an extension having a vertical surface to mount the optical element thereon and a horizontal extension to mount the optical element thereon.

22. The package in claim 15 wherein the first flexure comprises:
an optical component support having a pair of legs on opposite sides of a horizontal surface with a flexing spring region between each leg and the horizontal surface; and wherein the first base comprises a rod-shaped base with a spherical radius top with a horizontal surface thereon for suction handling, wherein the rod-shaped base includes a vertical surface for mounting the optical element thereon and curved side surfaces for handling.

23. The package defined in claim 15 wherein the first flexure comprises:
an optical component support having a pair of legs on opposite sides of a horizontal surface with a flexing spring region between each leg and the horizontal surface; and wherein the base comprises a C-shaped base with a vertical surface to mount the optical element as well as a cavity the opposite side of the first base in relation to the vertical surface, the cavity for mounting the optical element.

24. The package of claim 15 wherein the first base includes a semi-circular portion.

25. The package of claim 24 further comprising a flat handling surface on the semi-circular portion.

26. The package of claim 15 wherein the first base further comprises a groove for attaching an optical fiber.

27. The package defined in claim 26 wherein the first base further includes at least two surfaces to attach the at least two optical elements.

28. A package comprising:

one or more surfaces;

a first flexure having a first base attached to the one or more surfaces, a body, two pairs of legs coupled to the body via flexing spring regions, the flexing spring regions enabling legs of the two pairs of legs on opposite sides of the body to spread further apart in response to a force on the body when not attached to the one or more surfaces, and at least a pair of handling features; and at least two optical elements coupled to the first base of the flexure and aligned with an optical axis, the first base having at least one vertical surface to mount an optical element thereon perpendicular to the optical axis, wherein the optical element is one selected from the group that includes a laser, a lens, a modulator, a filter, a beam splitter, an isolator, a polarizer a detector, and a grating.

29. The package in claim 28 wherein the first flexure comprises:

an optical component support having a pair of legs on opposite sides of a horizontal surface with a flexing spring region between each leg and the horizontal surface; and wherein the first base comprises a rod-shaped portion with an extension having a vertical surface to mount the optical element thereon and a horizontal extension to mount the optical element thereon.

30. The package in claim 28 wherein the first flexure comprises:

an optical component support having a pair of legs on opposite sides of a horizontal surface with a flexing spring region between each leg and the horizontal surface; and wherein the first base comprises a rod-shaped base with a spherical radius top with a horizontal surface thereon for suction handling, wherein the rod-shaped base includes a vertical surface for mounting the optical element thereon and curved side surfaces for handling.

* * * * *

UNITED STATES PATENT AND TRADEMARK OFFICE
CERTIFICATE OF CORRECTION

PATENT NO. : 6,886,993 B2
DATED : May 3, 2005
INVENTOR(S) : Verdiell et al.

It is certified that error appears in the above-identified patent and that said Letters Patent is hereby corrected as shown below:

Column 3,
Line 31, after "components(s)", insert -- , --.

Column 13,
Line 18, after "polarizer", insert -- , --.

Signed and Sealed this

Ninth Day of August, 2005

JON W. DUDAS
*Director of the United States Patent and Trademark Office*